United States Patent [19]

Wengrovius et al.

[11] Patent Number: 4,891,402

[45] Date of Patent: Jan. 2, 1990

[54] ORGANIC SILICON-NITROGEN COMPOSITIONS AND THEIR USE AS ADHESION PROMOTERS IN ROOM TEMPERATURE VULCANIZABLE POLYDIORGANOSILOXANE COMPOSITIONS

[75] Inventors: Jeffrey H. Wengrovius, Scotia; Virginia M. VanValkenburgh, Albany, both of N.Y.; Steven J. Valenty, Tempe, Ariz.

[73] Assignee: General Electric Company, Schenectady, N.Y.

[21] Appl. No.: 192,038

[22] Filed: May 9, 1988

Related U.S. Application Data

[62] Division of Ser. No. 85,835, Aug. 17, 1987, abandoned.

[51] Int. Cl.$^4$ .............................. C08L 83/04
[52] U.S. Cl. ........................... 524/863; 428/447; 428/450; 524/188; 524/265; 524/730; 524/860; 528/16; 528/17; 528/18; 528/901; 528/34

[58] Field of Search .............. 524/188, 265, 730, 860, 524/863; 528/16, 17, 18, 901, 34; 428/447, 450

[56] References Cited

U.S. PATENT DOCUMENTS

| | | | |
|---|---|---|---|
| 2,946,701 | 7/1960 | Plueddemann | 428/417 |
| 3,334,121 | 8/1967 | Pepe et al. | 556/423 |
| 3,387,016 | 6/1968 | Nitzsche et al. | 556/423 |
| 3,389,160 | 6/1968 | Reid et al. | 556/423 |
| 4,543,381 | 9/1985 | Barlow et al. | 524/188 |
| 4,562,237 | 12/1985 | Okuno et al. | 528/17 |
| 4,797,446 | 1/1989 | Dietlein et al. | 528/17 |

*Primary Examiner*—Melvyn I. Marquis
*Attorney, Agent, or Firm*—William H. Pittman; James C. Davis, Jr.

[57] ABSTRACT

Organic silicon-nitrogen compositions are prepared by the reaction of approximately equimolar amounts of a glycidoxyalkyltrialkoxysilane and a primary amine such as isobutylamine. They are useful as adhesion promoters in room temperature vulcanizable compositions comprising polyalkoxysilyl-terminated polydiorganosiloxanes.

22 Claims, No Drawings

ORGANIC SILICON-NITROGEN COMPOSITIONS AND THEIR USE AS ADHESION PROMOTERS IN ROOM TEMPERATURE VULCANIZABLE POLYDIORGANOSILOXANE COMPOSITIONS

This application is a division of application Ser. No. 085,835, filed Aug. 17, 1987, now abandoned.

This invention relates to new compositions of matter, and more particularly to silicon-nitrogen compounds useful as adhesion promoters in room temperature vulcanizable compositions.

Considerable attention has been directed in recent years to the development of improved one-package room temperature vulcanizable (hereinafter sometimes designated "RTV") compositions. Under ideal conditions, these compositions would be stable for an indefinite period when stored in the absence of moisture, and would promptly cure to a tack-free elastomer upon contact with moisture, including the relatively small proportions of water vapor present in the atmosphere.

In a typical RTV composition, the predominant constituent is a polydiorganosiloxane (hereinafter sometimes designated "silicone" for brevity) containing polyalkoxysilyl end groups, typically dialkoxyalkylsilyl groups. Said end groups are capable of being cross-linked by atmospheric moisture in the presence of a suitable metal-containing catalyst, usually an aluminum, titanium or tin compound. Disclosures of RTV compositions of this type are present in many patents and publications.

Particularly useful one-package RTV compositions are disclosed in U.S. Pat. Nos. 4,517,337 and 4,667,007. They employ catalysts such as dibutyltin bis(acetylacetonate) and dibutyltin diethylmalonate, which are stable in the presence of hydroxy species such as methanol and silanol-terminated silicones and may therefore be employed without scavengers for such hydroxy species.

Many RTV compositions have inadequate adhesion to various substrates, particularly metals such as aluminum and steel. Therefore, it is a common practice to employ adhesion promoters in such compositions. Various aminosilanes, including those with primary, secondary and tertiary amine groups, are known to be adhesion promoters in various types of RTV's.

Upon testing many of the art-recognized adhesion promoters in the aforementioned scavenger-free RTV compositions, however, two things were discovered. In the first place, compounds containing tertiary amine groups, such as 3-diethylaminopropyltrimethoxysilane, for the most part do not adequately promote adhesion in these scavenger-free systems. In the second place, compounds containing primary amine groups, such as 3-aminopropyltrimethoxysilane and N-(3-methoxysilyl-propyl)ethylenediamine, sometimes cause yellowing of the RTV and may affect its modulus after curing. It is of interest, therefore, to develop new adhesion promoting materials which maintain color stability and do not otherwise adversely affect properties.

The present invention provides a class of novel organic silicon-nitrogen compositions useful as adhesion promoters, and a method for their preparation. It also provides novel RTV compositions containing said adhesion promoters, particularly scavenger-free compositions containing various organotin curing catalysts.

In one of its aspects, the present invention includes compositions prepared by effecting reaction at a temperature in the range of about 30°–100° C. between approximately equimolar amounts of a glycidoxyalkyl-trialkoxysilane of the formula

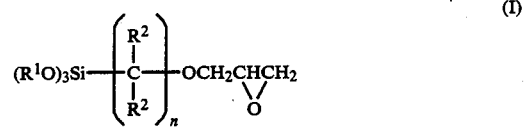

and a primary amine of the formula

wherein $R^1$ is $C_{1-8}$ alkyl, each $R^2$ is independently hydrogen or $C_{1-4}$ primary or secondary alkyl, $R^3$ is an alkyl or cycloalkyl radical containing about 3–10 carbon atoms and n is from 2 to about 10.

The $R^1$ radicals in the compositions of this invention are $C_{1-8}$ alkyl radicals, usually methyl. The $R^2$ radicals may be hydrogen or alkyl radicals as indicated and are usually hydrogen. $R^3$ is alkyl or cycloalkyl, usually primary alkyl and preferably $C_{4-8}$ primary alkyl; isobutyl is especially preferred. The value of n is usually 2 or 3, especially 3.

The method of this invention may be conveniently conducted by heating a mixture of the two reagents under reflux, ordinarily in an inert atmosphere such as nitrogen. As previously stated, approximately equimolar proportions of the two are employed; if an excess of either is present, it should typically be no more than about 5%. While solvents may be employed, they generally offer no particular advantage and therefore are not preferred.

For the most part, the reaction which takes place between the glycidoxyalkyltrialkoxysilane and the primary amine is a typical ring-opening of an epoxide with a nucleophilic reagent, yielding a vic-hydroxy secondary amine as a product. Further intramolecular or intermolecular reactions are possible, generally involving the hydroxy group and the trialkoxysilyl moiety with the generation of an alcohol of the formula $R^1OH$ and the formation of a new silicon-oxygen bond. The resulting condensation products may be cyclic or oligomeric materials. By reason of these additional reactions, the compositions of the present invention are most accurately defined in terms of the method for their preparation. Organic silicon-nitrogen compositions prepared by said method are another aspect of the invention.

It is known, however, that among the compounds present are the previously mentioned vic-hydroxy secondary amines. Therefore, such compounds, which are organic silicon-nitrogen compounds of the formula

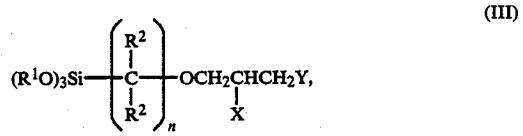

wherein one of X and Y is OH and the other is $NHR^3$ and $R^{1-3}$ and n are as previously defined, are still another aspect of the invention.

As previously indicated, the organic silicon-nitrogen compositions of this invention are useful as adhesion promoters in RTV compositions. Accordingly, a further aspect of the invention is a method for improving adhesion to a substrate of such a composition comprising a polyalkoxy-terminated polydiorganosiloxane (silicone) and a catalytic amount of a curing catalyst, said method comprising incorporating therein an effective amount, typically about 0.1–5.0 parts per 100 parts of said polyalkoxysilyl-terminated polydiorganosiloxane, of said organic silicon-nitrogen composition.

Still another aspect of the invention is RTV compositions comprising (A) at least one polyalkoxy-terminated silicone, (B) a catalytic amount of a curing catalyst, and (C) an amount effective to enhance adhesion to a substrate of said organic silicon-nitrogen composition.

The polyalkoxysilyl-terminated silicones useful as component A may be represented by the formula

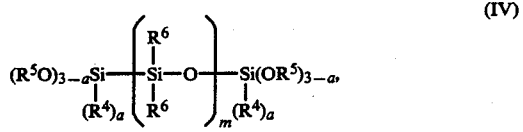

(IV)

wherein $R^4$ is an unsubstituted or substituted hydrocarbon radical containing from 1 to about 13 carbon atoms, $R^5$ is an alkyl, alkoxyalkyl, acylalkyl, acyloxyalkyl or cyanoalkyl radical containing from 1 to about 8 carbon atoms or an aralkyl radical containing from 1 to about 14 carbon atoms, each $R^6$ is independently an unsubstituted or substituted hydrocarbon radical containing about 1–13 carbon atoms, a is 0 or 1 and m is in the range of about 5–5000. Illustrative $R^4$ and $R^6$ radicals are methyl, ethyl, phenyl, trifluoropropyl and vinyl. Alkyl radicals having up to about 4 carbon atoms and especially methyl radicals are preferred. $R^5$ may be alkyl or the designated substituted alkyl radicals containing aryl, ethyl, ester, ketone or cyano substituents; it is also most often $C_{1-4}$ alkyl and especially methyl. The value of a is 0 or 1 and most often 1.

Component A may be prepared in situ in the RTV composition by the reaction of a silanol-terminated silicone and, as an endcapping reagent, a polyalkoxysilane such as methyltrimethoxysilane, in accordance with U.S. Pat. No. 4,395,526. It may also be previously formed by the same reaction, most often in the presence of a catalyst as disclosed, for example, in U.S. Pat. No. 4,515,932 and copending, commonly owned application Ser. No. 090,183, abandoned. The time of its formation is not critical for the purposes of this invention, although it is frequently preferred to employ a previously formed polyalkoxysilyl-terminated silicone.

Component B, the curing catalyst, may be any of the metal-containing catalysts known in the art. As previously noted, these are usually aluminum, titanium or tin compounds. In a particularly preferred embodiment of the invention, the catalyst is an organotin complex of the formula

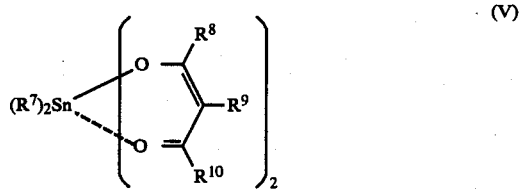

(V)

or an organotin salt of the formula

(VI)

wherein $R^7$ is an unsubstituted or substituted hydrocarbon radical containing from 1 to about 18 carbon atoms; each of $R^8$, $R^9$ and $R^{10}$ is independently hydrogen, $R^{12}$, $Si(R^{12})_3$, acyl or nitrile; $R^{12}$ is an unsubstituted or substituted hydrocarbon radical containing from 1 to about 18 carbon atoms; and Y is a dicarboxylate group such as diethylmalonate. Compounds of formulas V and VI and their use as RTV curing catalysts are disclosed in the aforementioned U.S. Pat. Nos. 4,517,337 and 4,667,007, the disclosures of which are incorporated by reference herein.

Component C, the organic silicon-nitrogen composition of the present invention, is employed in the RTV composition as an adhesion promoter. Its action as such is frequently optimized if it is employed in combination with at least one additional adhesion promoter. Particularly useful in this regard are (D) cyanoalkyltrialkoxysilanes such as 2-cyanoethyltrimethoxysilane (hereinafter "CETMS") or 3-cyanopropyltrimethoxysilane, which act as synergists for the composition of this invention.

Components B and C are present in the RTV compositions of this invention in effective proportions to serve as catalysts and adhesion promoters, respectively. In general, about 0.1–10.0 parts of component B and about 0.1–5.0 parts of component C are employed per 100 parts of component A. When employed, component D is usually present in the amount of about 0.1–5.0 parts per 100 parts of component A.

The RTV compositions of the invention may also contain other constituents in common use in such compositions, including curing catalyst accelerators, scavengers for hydroxy species, plasticizers, pigments and fillers. In particular, at least one of the following may be present, all proportions being per 100 parts of component A:

(E) about 0.05–5.0 parts of a diketone of the formula

(VI)

wherein $R^{8-10}$ are as previously defined;

(F) about 0.01–10.0 parts of at least one polyalkoxysilane of the formula

(VII)

wherein $R^{4-5}$ and a are as previously defined;

(G) about 1–50 parts of a plasticizer;

(H) about 5–700 parts of at least one filler; and (J) about 0.1–5.0 parts of an amine or guanidine as a curing accelerator.

Components E and F are often particularly preferred other constituents. Their presence contributes to the shelf stability of the RTV composition in the absence of moisture and its rapidity of cure in the presence of moisture.

The presence of component G is also frequently preferred. Suitable plasticizers useful as component G include trialkylsilyl-terminated polydiorganosiloxanes of the formula

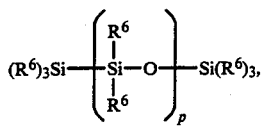

(VIII)

wherein $R^6$ is as previously defined and p is in the range of about 25–5000.

The presence or absence of component H, the filler, will depend to some extent on the intended use of the RTV composition. When the composition is to be used as a construction sealant or caulking compound, relatively large proportions of filler may be employed. For other uses, minor proportions of filler or no filler may be advisable. Suitable fillers include reinforcing materials such as silica aerogel, fumed silica, precipitated silica, glass fibers, titanium dioxide, zirconium silicate, iron oxide, calcium carbonate, diatomaceous earth and carbon black, and extending materials such as ground quartz and polyvinyl chloride, as well as mixtures thereof. It is frequently advantageous to pretreat a silica filler with an activating agent such as octamethylcyclotetrasiloxane.

Various amines and guanidines, optionally alkoxysilyl-substituted, are known to be useful as curing accelerators (component J). Suitable accelerators are disclosed, for example, in the aforementioned U.S. Pat. No. 4,517,337.

The preparation and properties of the compositions of the present invention are illustrated by the following examples. Parts are by weight. All RTV compositions were prepared by conventional high-shear mixing techniques in a nitrogen atmosphere, under the equivalent of "dry box" conditions. Viscosities are Brookfield viscosities at 25° C.

EXAMPLE 1

A mixture of 100 parts (420 mmol.) of 3-glycidoxypropyltrimethoxysilane and 30.9 parts (420 mmol.) of isobutylamine was heated under reflux in a nitrogen atmosphere. The progress of the reaction was followed by gas chromatography, which showed the reaction to be complete after 1½ hours. Volatile materials were removed in vacuum, yielding the desired organic silicon-nitrogen composition. The presence of at least one compound of the formula

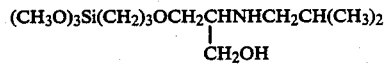

was confirmed by gas chromatographic mass spectroscopy.

EXAMPLES 2–3

RTV compositions were prepared by blending, under high shear conditions, 100 parts of a polymethoxysilyl-terminated polydimethylsiloxane having a viscosity of 1500 poises, 1.04 parts of CETMS, 16.9 parts of octamethylcyclotetrasiloxane-treated fumed silica and 30 parts of a trimethylsilyl-terminated polydimethylsiloxane oil, and subsequently adding 0.58 part of di-n-octyltin diethylmalonate, 0.37 part of diisobutylamine, 1.48 parts of methyltrimethoxysilane and the product of Example 1 as an adhesion promoter.

Adhesion-in-peel on unprimed aluminum was determined according to ASTM test method C794 after various periods of cure at 50% relative humidity, and are reported in millipascals. Yellowness index (YI) was determined immediately after mixing and after heat aging for 12 hours at 150° C., using a colorimeter. For visual comparison, a YI value on the order of 2–3 represents a material which is colorless to the human eye, while a value of 10 represents a material which is distinctly yellow.

The relevant parameters and test results are given in the following table, in comparison with three controls in which other adhesion promoters were substituted for the product of Example 1.

| Example | Adhesion promoter Identity | Parts | Peel strength 3 days | Peel strength 7 days | YI Initial | YI After aging |
|---|---|---|---|---|---|---|
| 2 | Ex. 1 | 0.74 | 572 | 476 | 1.3 | 7.0 |
| 3 | Ex. 1 | 0.74 | 138 | 338 | — | — |
|   | Tris(3-trimethoxy-silylpropyl) isocyanurate | 0.15 | | | | |
| Control A | Tris(3-trimethoxy-silylpropyl) isocyanurate | 0.74 | 35 | 35 | — | — |
| Control B | N—(3-trimethoxy-silylpropyl)-ethylenediamine | 0.74 | — | — | 2.9 | 28.8 |
| Control C | 3—Glycidoxypropyl-trimethoxysilane | 0.74 | 35 | 35 | — | — |

EXAMPLE 4

An RTV composition was prepared by blending, under high shear conditions, 100 parts of the polymethoxysilyl-terminated polydimethylsiloxane of Examples 2–3, 0.68 parts of methyltrimethoxysilane, 16.0 parts of octamethylcyclotetrasiloxane-treated fumed silica and 22.9 parts of a trimethylsilyl-terminated polydimethylsiloxane oil, and subsequently adding 0.42 part of di-n-butyltin bis(acetylacetonate), 0.35 part of acetylacetone, 0.70 part of methyltrimethoxysilane and 0.70 part of the product of Example 1.

The adhesion-in-peel value after 14 days of cure at 50% relative humidity was 83 millipascals. For comparison, a control in which the adhesion promoter was omitted gave a value less than 35 psi.

What is claimed is:

1. A method for improving adhesion to a substrate of a room temperature vulcanizable composition comprising a polyalkoxy-terminated polydiorganosiloxane and a catalytic amount of a curing catalyst, said method comprising incorporating therein an effective amount of a silicon-nitrogen composition prepared by effecting reaction at a temperature in the range of about 30°–100° C. between approximately equimolar amounts of a glycidoxyalkyltrialkoxysilane of the formula

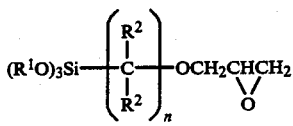  (I)

and a primary amine of the formula $R^3$—$NH_2$,  (II)

wherein $R^1$ is $C_{1-8}$ alkyl, each $R^2$ is independently hydrogen or $C_{1-4}$ primary or secondary alkyl, $R^3$ is an alkyl or cycloalkyl radical containing about 3–10 carbon atoms and n is from 2 to about 10.

2. A method according to claim 1 wherein the substrate is aluminum or steel.

3. A method according to claim 2 wherein about 0.1–5.0 parts by weight of said compound is employed per 100 parts of said polydiorganosiloxane.

4. A method according to claim 3 wherein $R^1$ is methyl, $R^2$ is hydrogen, $R^3$ is isobutyl and n is 3.

5. A room temperature vulcanizable composition comprising (A) at least one polyalkoxy-terminated polydiorganosiloxane, (B) a catalytic amount of a curing catalyst, and (C) an amount effective to enhance adhesion to a substrate of a silicon-nitrogen composition prepared by effecting reaction at a temperature in the range of about 30°–100° C. between approximately equimolar amounts of a glycidoxyalkyltrialkoxysilane of the formula

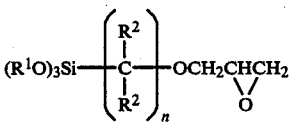  (I)

and a primary amine of the formula $R^3$—$NH_2$,  (II)

wherein $R^1$ is $C_{1-8}$ alkyl, each $R^2$ is independently hydrogen or $C_{1-4}$ primary or secondary alkyl, $R^3$ is an alkyl or cycloalkyl radical containing about 3–10 carbon atoms and n is from 2 to about 10.

6. A composition according to claim 5 wherein component B is an organotin complex of the formula

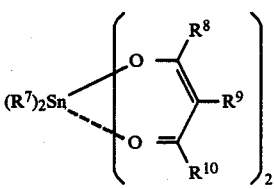  (V)

or an organotin salt of the formula $(R^7)_2SnY$,  (VI)

wherein $R^7$ is an unsubstituted or substituted hydrocarbon radical containing from 1 to about 18 carbon atoms; each of $R^8$, $R^9$ and $R^{10}$ is independently hydrogen, $R^{12}$, $Si(R^{12})_3$, acyl or nitrile; $R^{12}$ is an unsubstituted or substituted hydrocarbon radical containing from 1 to about 18 carbon atoms; Y is a dicarboxylate group; and m is 0 or 1.

7. A composition according to claim 6 wherein about 0.1–10.0 parts of component B and about 0.1–5.0 parts of component C are employed per 100 parts of component A.

8. A composition according to claim 7 which also comprises at least one of the following, all proportions being per 100 parts of component A:

(E) about 0.05–5.0 parts of a diketone of the formula

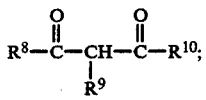  (VI)

(F) about 0.01–10.0 parts of at least one polyalkoxysilane of the formula $(R^4)_aSi(OR^5)_{4-a}$,  (VII)

wherein $R^4$ is an unsubstituted or substituted hydrocarbon radical containing from 1 to about 13 carbon atoms, $R^5$ is an alkyl, alkoxyalkyl, acylalkyl, acyloxyalkyl or cyanoalkyl radical containing from 1 to about 8 carbon atoms or an aralkyl radical containing from 1 to about 14 carbon atoms, and a is 0 or 1;

(G) about 1–50 parts of a plasticizer;

(H) about 5–700 parts of at least one filler; and (J) about 0.1–5.0 parts of an amine or guanidine as a curing accelerator.

9. A composition according to claim 8 which also comprises (D) a cyanoalkyltrialkoxysilane in the amount of about 0.1–5.0 parts per 100 parts of component A.

10. A composition according to claim 9 which also comprises components E, F and G, wherein component G is at least one trialkylsilyl-terminated polydiorganosiloxane of the formula

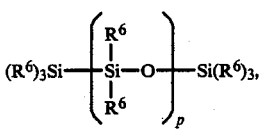  (VIII)

wherein $R^6$ is an unsubstituted or substituted hydrocarbon radical containing about 1–13 carbon atoms and p is in the range of about 25–5000.

11. A composition according to claim 10 wherein component B has formula V; $R^{4-6}$, $R^8$ and $R^{10}$ are methyl, $R^7$ is n-butyl, $R^9$ is hydrogen and a is 1.

12. A method for improving adhesion to a substrate of a room temperature vulcanizable composition comprising a polyalkoxy-terminated polydiorganosiloxane and a catalytic amount of a curing catalyst, said method comprising incorporating therein an effective amount of a silicon-nitrogen compound of the formula

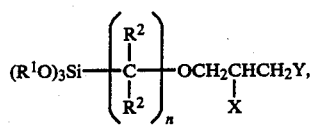

wherein one of X and Y is OH and the other is NHR$^3$, R$^1$ is C$_{1-8}$ alkyl, each R$^2$ is independently hydrogen or C$_{1-4}$ primary or secondary alkyl, R$^3$ is an alkyl or cycloalkyl radical containing about 3–10 carbon atoms and n is from 2 to about 10.

13. A method according to claim 12 wherein the substrate is aluminum or steel.

14. A method according to claim 13 wherein about 0.1–5.0 parts by weight of said compound is employed per 100 parts of said polydiorganosiloxane.

15. A method according to claim 14 wherein R$^1$ is methyl, R$^2$ is hydrogen, R$^3$ is isobutyl and n is 3.

16. A room temperature vulcanizable composition comprising (A) at least one polyalkoxy-terminated polydiorganosiloxane, (B) a catalytic amount of a curing catalyst, and (C) an amount effective to enhance adhesion to a substrate of a silicon-nitrogen compound of the formula

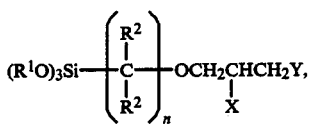

wherein one of X and Y is OH and the other is NHR$^3$, R$^1$ is C$_{1-8}$ alkyl, each R$^2$ is independently hydrogen or C$_{1-4}$ primary or secondary alkyl, R$^3$ is an alkyl or cycloalkyl radical containing about 3–10 carbon atoms and n is from 2 to about 10.

17. A composition according to claim 16 wherein component B is an organotin complex of the formula

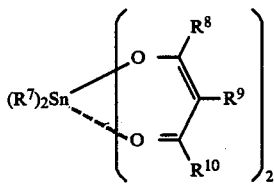

or an organotin salt of the formula

  (VI)

wherein R$^7$ is an unsubstituted or substituted hydrocarbon radical containing from 1 to about 18 carbon atoms;

each of R$^8$, R$^9$ and R$^{10}$ is independently hydrogen, R$^{12}$, Si(R$^{12}$)$_3$, acyl or nitrile; R$^{12}$ is an unsubstituted or substituted hydrocarbon radical containing from 1 to about 18 carbon atoms; and Y is a dicarboxylate group.

18. A composition according to claim 17 wherein about 0.1–10.0 parts of component B and about 0.1–5.0 parts of component C are employed per 100 parts of component A.

19. A composition according to claim 18 which also comprises at least one of the following, all proportions being per 100 parts of component A;

(E) about 0.05–5.0 parts of a diketone of the formula

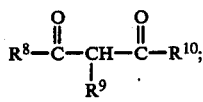

(F) about 0.01–10.0 parts of at least one polyalkoxysilane of the formula

  (VII)

wherein R$^4$ is an unsubstituted or substituted hydrocarbon radical containing from 1 to about 13 carbon atoms, R$^5$ is an alkyl, alkoxyalkyl, acylalkyl, acyloxyalkyl or cyanoalkyl radical containing from 1 to about 8 carbon atoms or an aralkyl radical containing from 1 to about 14 carbon atoms, and a is 0 or 1;

(G) about 1–50 parts of a plasticizer;

(H) about 5–700 parts of at least one filler; and (J) about 0.1–5.0 parts of an amine or guanidine as a curing accelerator.

20. A composition according to claim 19 which also comprises (D) a cyanoalkyltrialkoxysilane in the amount of about 0.1–5.0 parts per 100 parts of component A.

21. A composition according to claim 20 which also comprises components E, F and G, wherein component G is at least one trialkylsilyl-terminated polydiorganosiloxane of the formula

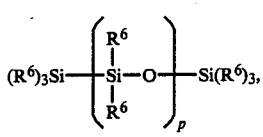

wherein R$^6$ is an unsubstituted or substituted hydrocarbon radical containing about 1–13 carbon atoms; and p is in the range of about 25–5000.

22. A composition according to claim 21 wherein component B has formula V; R$^{4-6}$, R$^8$ and R$^{10}$ are methyl, R$^7$ is n-butyl, R$^9$ is hydrogen and a is 1.

* * * * *

UNITED STATES PATENT AND TRADEMARK OFFICE
CERTIFICATE OF CORRECTION

PATENT NO. : 4,891,402

DATED : January 2, 1990

INVENTOR(S) : Wengrovius et al.

It is certified that error appears in the above-identified patent and that said Letters Patent is hereby corrected as shown below:

Column 3, line 20,

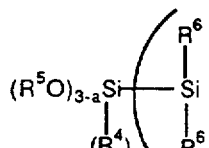

should read

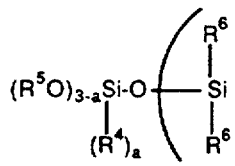

Column 5, line 5,

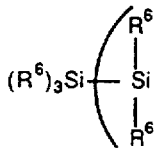

should read

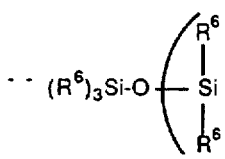

UNITED STATES PATENT AND TRADEMARK OFFICE
CERTIFICATE OF CORRECTION

PATENT NO. : 4,891,402

DATED : January 2, 1990

INVENTOR(S) : Wengrovius et al.

It is certified that error appears in the above-identified patent and that said Letters Patent is hereby corrected as shown below:

Column 8, line 55,

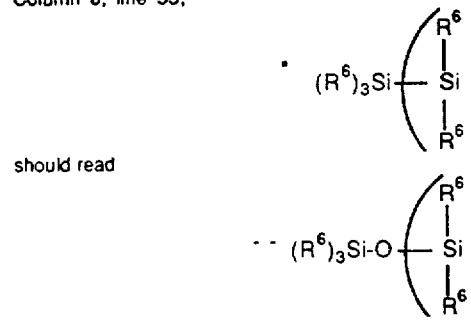

should read

UNITED STATES PATENT AND TRADEMARK OFFICE
CERTIFICATE OF CORRECTION

PATENT NO. : 4,891,402
DATED : January 2, 1990
INVENTOR(S) : Wengrovius et al.

It is certified that error appears in the above-indentified patent and that said Letters Patent is hereby corrected as shown below:

Column 10, line 45, should read

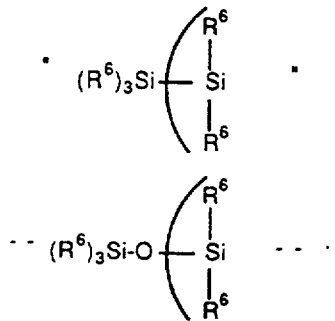

Signed and Sealed this

Fourteenth Day of December, 1993

Attest:

BRUCE LEHMAN

Attesting Officer      Commissioner of Patents and Trademarks